US011966500B2

(12) United States Patent
Tormasov et al.

(10) Patent No.: US 11,966,500 B2
(45) Date of Patent: Apr. 23, 2024

(54) SYSTEMS AND METHODS FOR ISOLATING PRIVATE INFORMATION IN STREAMED DATA

(71) Applicant: Acronis International GmbH, Schaffhausen (CH)

(72) Inventors: Alexander Tormasov, Moscow (RU); Serguei Beloussov, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 349 days.

(21) Appl. No.: 17/395,918

(22) Filed: Aug. 6, 2021

(65) Prior Publication Data

US 2022/0050924 A1 Feb. 17, 2022

Related U.S. Application Data

(60) Provisional application No. 63/065,623, filed on Aug. 14, 2020.

(51) Int. Cl.
*G06F 21/62* (2013.01)
*G06F 3/06* (2006.01)

(52) U.S. Cl.
CPC ........ *G06F 21/6263* (2013.01); *G06F 3/0623* (2013.01); *G06F 3/0644* (2013.01); *G06F 3/0683* (2013.01)

(58) Field of Classification Search
CPC .. G06F 21/6253; G06F 3/0623; G06F 3/0644; G06F 3/0683

USPC .......................................................... 726/26
See application file for complete search history.

(56) References Cited

U.S. PATENT DOCUMENTS

| 6,279,041 | B1 * | 8/2001 | Baber ..................... H04L 47/43 370/235 |
| 2005/0132070 | A1 * | 6/2005 | Redlich ............... G06F 21/6209 709/228 |
| 2006/0050794 | A1 * | 3/2006 | Tan ..................... H04N 21/4348 375/240.26 |
| 2008/0141299 | A1 * | 6/2008 | Eyer .................... H04N 21/235 725/32 |
| 2015/0172775 | A1 * | 6/2015 | Yee .................... H04N 21/6587 725/37 |
| 2017/0163720 | A1 * | 6/2017 | Bergek ............... H04L 12/2867 |

(Continued)

*Primary Examiner* — Michael S McNally
(74) *Attorney, Agent, or Firm* — ArentFox Schiff LLP; Michael Fainberg

(57) ABSTRACT

Disclosed herein are systems and method for isolating private information in streamed data. In an exemplary aspect, a method may comprise receiving a stream of data, for storage in a first storage device, and an indication of how the stream will be utilized by an end user. The method may comprise comparing the indication against a plurality of rules, wherein each rule indicates a type of private information that should be isolated from a given input stream based on a respective indication of usage for the given input stream. The method may comprise identifying and extracting a first type of private information that should be isolated from the stream, modifying the stream by removing the first type of private information from the stream, storing the modified stream in the first storage device, and storing the extracted first type of private information in a different location from the modified stream.

20 Claims, 4 Drawing Sheets

(56) References Cited

U.S. PATENT DOCUMENTS

2017/0372289 A1* 12/2017 Fitzsimmons ....... G07G 1/0009
2022/0121689 A1*  4/2022 James ............... G06F 16/24568

* cited by examiner

SYSTEMS AND METHODS FOR ISOLATING PRIVATE INFORMATION IN STREAMED DATA

CROSS-REFERENCE TO RELATED APPLICATIONS

This application claims the benefit of U.S. Provisional Application No. 63/065,623, filed Aug. 14, 2020, which is herein incorporated by reference.

FIELD OF TECHNOLOGY

The present disclosure relates to the field of data security, and, more specifically, to systems and methods for isolating private information in streamed data.

BACKGROUND

In recent years, the problem of privacy of personal data has become more prominent because more systems and services collect and store large amounts of data than ever before. The data may be collected by various websites and online stores, and includes information from users, such as names, home addresses, email addresses, information about age, marital and financial situations, etc. Another stream of personal data is associated with the widespread introduction of surveillance cameras, which produce a large number of records containing people, their faces, license plate numbers, etc. In combination with software dedicated to recognizing faces, this can often pose a significant threat to the personal and private life of many people. All of this data is usually not just collected and recorded. Often they are then placed in various data storages, where they can be stored for a very long time—several years or even decades. This kind of storage, if the collected data is stored "as is", can be the cause of massive leaks of private information.

Accordingly, the protection of personal data in the era of "big data" is paramount. When collecting information (e.g., audio and video recording, personal data recording via forms and questionnaires, etc.) private information should be identified and processed in a secure way (e.g., removed, hidden from public access, etc.).

SUMMARY

Aspects of the disclosure describe methods and systems for isolating private information in streamed data. In an exemplary aspect, a method may comprise receiving a stream of data, for storage in a first storage device, and an indication of how the stream will be utilized by an end user. The method may comprise comparing the indication against a plurality of rules, wherein each rule indicates a type of private information that should be isolated from a given input stream based on a respective indication of usage for the given input stream. The method may comprise identifying, based on the comparing of the indication, a first type of private information that should be isolated from the stream. In response to determining that the first type of private information is present in the stream, the method may comprise extracting the first type of private information from the stream. The method may comprise modifying the stream by removing the first type of private information from the stream. The method may comprise storing the modified stream in the first storage device, and storing the extracted first type of private information in a different location from the modified stream.

In some aspects, the different location is one of: a second storage device or a different portion of the first storage device.

In some aspects, the extracted first type of private information is, based on a rule of the plurality of rules, one of: facial images, names, addresses, license plate numbers, financial information, medical information, and government records.

In some aspects, extracting the first type of private information from the stream further comprises generating metadata that comprises information for merging the extracted first type of private information and the modified stream to reproduce the stream originally received.

In some aspects, the method further comprises storing the metadata in the different location with the extracted first type of private information.

In some aspects, the method may comprise storing the metadata in another location that is different from both the first storage device and the different location where the extracted first type of private information is stored.

In some aspects, the method may comprise identifying, based on the comparing of the indication, a second type of private information that should be isolated from the stream. In response to determining that the second type of private information is present in the stream, the method may comprise extracting the second type of private information from the stream, and modifying the stream by removing the second type of private information from the stream.

In some aspects, the method may comprise storing the extracted second type of private information in the different location with the extracted first type of private information.

In some aspects, the method may comprise storing the extracted second type of private information in another location that is different from both the first storage device and the different location where the extracted first type of private information is stored.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for isolating private information in streamed data. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
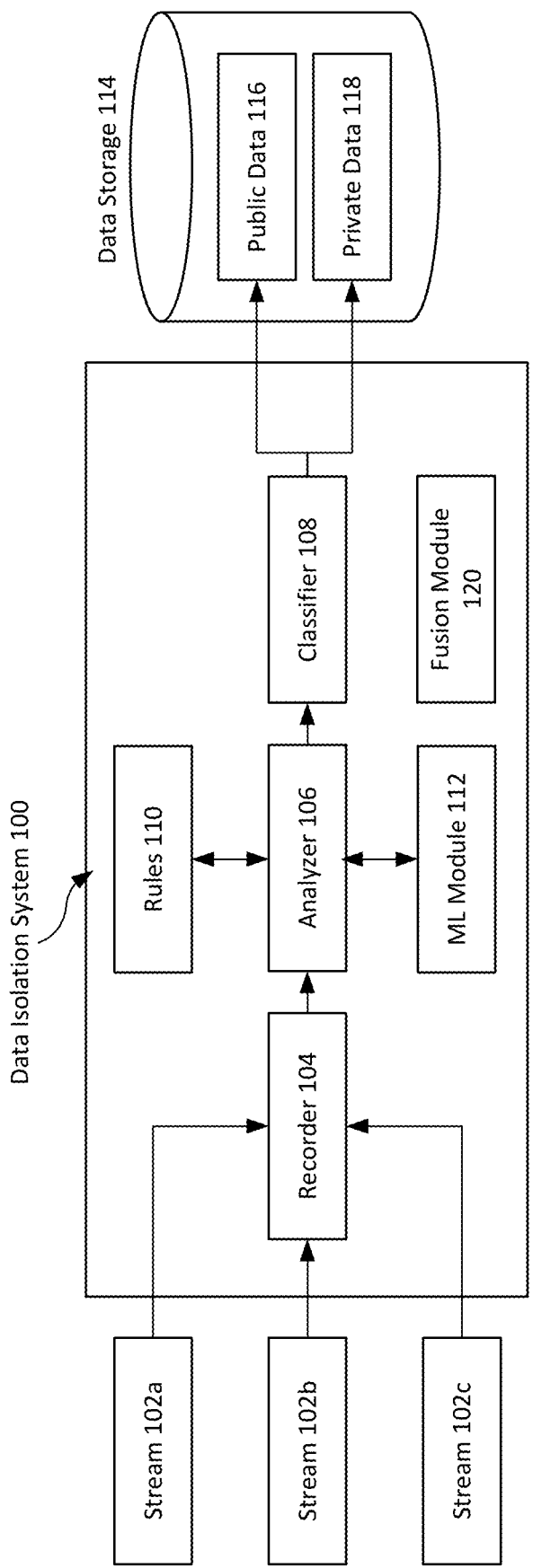
FIG. 1 is a block diagram illustrating a system for isolating private information in streamed data.

FIG. 1 is a block diagram illustrating data isolation system 100 for isolating private information in streamed data, in accordance with aspects of the present disclosure. Data isolation system 100 may be a software that is stored on a computing device that is uploading one of streams 102, or may be a software that is stored on a server that receives one of streams 102. System 100 comprises recorder 104, analyzer 106, classifier 108, ML module 112, and rules 110. Streams 102 comprises audio and visual material transmitted/received in a continuous flow.

Recorder 104 may be a module that records or collects streams in an appropriate digital format. Recorder 104 receives a stream of data (e.g., stream 102a), for storage in a first storage device (e.g., data storage 114), and an indication of how the stream will be utilized by an end user. The indication may be a tag comprised in the metadata of the stream. Recorder 104 may extract the tag from the indication. A plurality of tags may exist including, but not limited to, "outdoor security surveillance," "movie streaming," "show streaming," "music streaming," "sports streaming," "lecture presentation," "miscellaneous storage," "government review," "hospital examination," "movie development," "personal viewing," etc.

It should be noted that system 100 isolates private data from a given stream based on how the stream will be used rather than what the stream comprises. For example, each of stream 102a, 102b, and 102c may be videos of a street near a park. From the perspective of data isolation system 100, each stream is simply a video (possibly of different formats, sizes, and lengths). However, stream 102a may be a surveillance video, stream 102b may be a released movie, and stream 102c may be an unreleased movie clip. The purpose of stream 102a may be for law enforcement to monitor criminal activity in a neighborhood and thus a tag may indicate "outdoor security surveillance." The intended purpose of stream 102b may be casual viewing by any member of the public, and therefore a tag may indicate "movie streaming." The intended purpose of stream 102c may be to insert CGI into a movie that has yet to be released, and therefore a tag may indicate "movie development."

Despite all three streams depicting similar content/environments, because the streams are utilized in a different manner, the data isolation process will be different for each. For example, the surveillance video may be confidential and system 100 may classify license plate numbers and faces in stream 102a as private data. In contrast, the released movie may already be in the public domain and removing faces from the movie is unnecessary, which is why nothing may be classified as private data in stream 102b. In terms of stream 102c, a movie production studio may not want the public to have access to leaks. System 100 may accordingly classify the faces of the actors and the audio of the clip as private data. System 100 is configured to isolate private data from the stream such that if the stream is accessed by an unauthorized entity, the private data is hidden. Therefore, if leakers attempt to access stream 102c, they will only be able to view a silent video of an unidentified person in a green screen environment. This is particularly useful if movie studios want to hide surprise cameos because the actors and their voices will not be recognizable.

Depending on the indication of usage of a stream, rules 110 is used to determine what constitutes private data. Rules 110 may be a database comprising a plurality of rules. Each rule defines the scope of data usage and necessary corrections to apply to the stream based on custom conditions, data retention policies, legal limitations, etc. For example, rules may be organized in the following manner:

TABLE 1

Exemplary Rules 110

| Rule No. | Indication | Types of Private Information to Isolate |
| --- | --- | --- |
| 1 | Outdoor Surveillance | Facial Images |
|  |  | License Plate Numbers |
| 2 | Movie Streaming | N/A |
| ... | ... | ... |
| N | Movie Development | Audio |
|  |  | Facial Images |

Suppose that system 100 receives stream 102a, which is a video to be used for outdoor security surveillance by law enforcement. Stream 102a is to be stored in data storage 114. Analyzer 106 compares the indication of usage provided with stream 102a against the plurality of rules in rules 110. As mentioned previously, each rule indicates type(s) of private information that should be isolated from a given input stream based on a respective indication of usage for the given input stream. In response to determining that the indication of usage of stream 102a matches an indication of a rule in rules 110 (i.e., rule 1), analyzer 106 identifies, a first type of private information that should be isolated from stream 102a. The first type of private information is facial images. It should be noted that the types of private information that system 100 can identify are not limited to what is shown in table 1. Other types of private information that system 100 may recognize include, but are not limited to, names, addresses, financial information, medical information, and government records. It should be noted that the rules can be customized by a user of system 100.

Analyzer 106 may then perform a frame-by-frame analysis to determine whether the first type of private information (e.g., facial images) is present in stream 102a. For example, analyzer 106 may utilize computer vision algorithms such as facial recognition, to identify a face in a frame of stream 102a. In some aspects, analyzer 106 may rely on machine learning (ML) module 112 to search for types of private information in a given stream. ML module 112 may be configured to perform a variety of classification algorithms including, but not limited to, facial recognition, object recognition, textual classification, voice recognition, etc.

In response to detecting various faces in stream 102a, analyzer 106 may extract the first type of private information from the stream 102a. For example, analyzer 106 may record the pixel values of the region of each frame where a face is detected. Analyzer 106 may also generate metadata that comprises information for where the extracted information came from. This metadata can later be used to reconstruct the original stream. Suppose that the extracted first type of information comprises pixel maps with facial information. The metadata may indicate which frame the pixel maps belong to and their respective positions (e.g., X,Y coordinates) in a respective frame.

As shown in table 1, videos used for surveillance may comprise a second type of private information: license plate numbers. Analyzer 106 may thus also determine whether license plate numbers are present in stream 102a. In this case, analyzer 106 may search for text within a frame, that has a particular structure. For example, license plates in a certain city (where the video is taken) may be a 7-character value where the first three values are letters and the next four values are numbers. Analyzer 106 may search for this type of text. In another approach, analyzer 106 may utilize computer vision algorithms such as object recognition to identify vehicles and subsequently visible license plates on the vehicles. In response to identifying license plate numbers in stream 102a, analyzer 106 may extract the second type of private information from the stream as well.

Subsequent to extracting the type(s) of private information in a given stream, analyzer 106 may modify the stream by removing the type(s) of private information from the stream. For example, analyzer 106 may remove portions of the frames in stream 102a that have been extracted, namely, portions containing either facial images or license plate numbers. This results in a modified stream 102a that does not comprise private information. The removal of private information can be performed by distorting the original stream such that it can no longer be used to identify certain individuals or objects (e.g., blurring the picture, distortion of sound, masking, etc.).

Classifier 108 receives both the modified stream and the extract private information. Classifier 108 is configured to determining how to store the received data. Depending on the number of storage destinations available, classifier 108 may either store both the modified stream and the extracted private information in the same or different storage device. For example, in FIG. 1, only one storage device is available. Based on this availability, classifier 108 may store the modified stream in public data 116 and the extracted private information in private data 118. Public data 116 and private data 118 may be separate directories in data storage 114. In some aspects, public data 116 and private data 118 are in different partitions of the same data storage device. In some aspects, public data 116 and private data 118 are stored in different virtual machines (VMs). In some aspects, the access rights to the private data are more limited (e.g., may include stronger encryption techniques) than the access rights to the public data (i.e., modified stream 102a).

After public data 116 and private data 118 is stored in its respective destination, a user may wish to retrieve the data in its original form. Data isolation 100 may include a fusion module 120 that is configured to combine the separated data using the metadata information generated during the split (thus forming a reconstructed stream). Consider the following metadata example:

TABLE 2

Example Metadata

| Frame | ID  | Type   | Portion (px × px) | Location (x, y) |
|-------|-----|--------|-------------------|-----------------|
| 1     | abc | Facial | 200 × 300         | (721, 345)      |
| 1     | xyz | Text   | 10 × 50           | (1, 1)          |
| ...   | ... | ...    | ...               | ...             |
| N     | ... | ...    | ...               | ...             |

This example depicts metadata for a given stream. Accordingly, all types of private information are listed in the same file. In some aspects, for each type of private information, there may be a separate metadata file that is stored in a separate location. Fusion module 120 may receive a public frame of a stream that has a particular frame number (e.g., 1-N). Fusion module 120 may also receive a plurality of private data files, each with an identifier (e.g., "abc," "xyz"). Fusion module 120 may refer to the metadata, which indicates how to merge the public frame with the private data files. For example, private data named "abc" may be a 200×300 pixels image that depicts a face. Fusion module 120 may determine, based on the metadata, that the private data is to be inserted into frame 1 at location (721, 345). In some aspects, the location may be a certain position. In other aspects, the location may be a corner position. For example, location (721, 345) may represent the $721^{st}$ pixel to the right of the first column and the $345^{th}$ pixel from the top of the first row. This position may be where the first pixel in the 200×300 image is located. In other aspects, it may be where the center pixel in the 200×300 image is located. In response to receiving a command to merge the private data and the public data, fusion module 120 generates the reconstructed stream.

Figure 2:
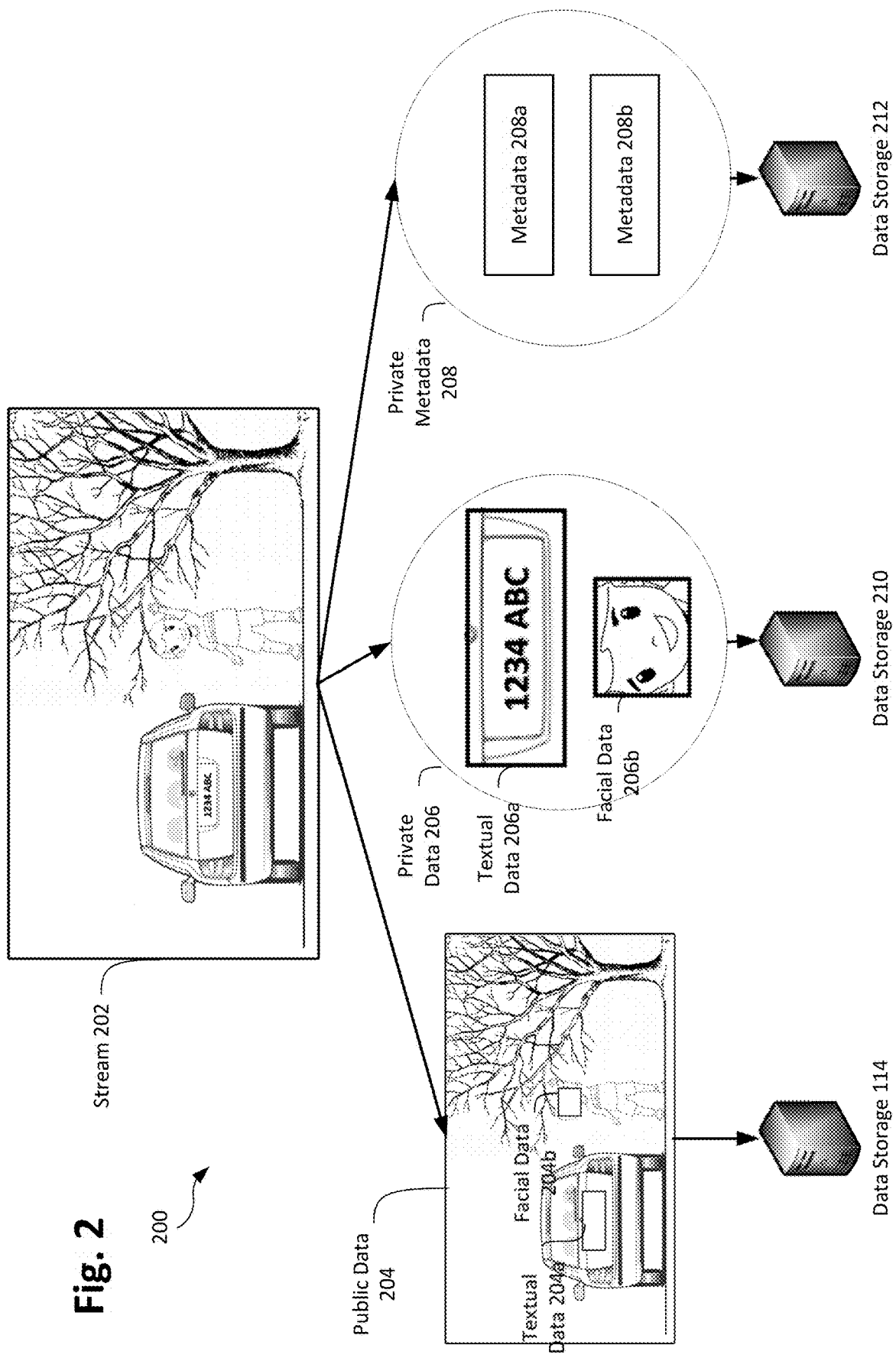
FIG. 2 is a block diagram illustrating an example of how private information is isolated from public data.

FIG. 2 is a block diagram illustrating example 200 of how private information is isolated from public data, in accordance with aspects of the present disclosure. Stream 202 may be an image that or a frame of a video. The usage of stream 202 may be for "surveillance" by law enforcement. To prevent the public from accessing the contents of stream 202, analyzer 106 may extract facial information and license plate numbers from stream 202. Analyzer 106 may further modify stream 202 to remove the extracted private information from stream 202. This generates public data 204, which comprises the modified stream 202, private data 206, which comprises the extracted private information, and private metadata 208, which comprises information related to the private data 206 to allow for the merging of the extracted private information and the modified stream (to reproduce the stream originally received).

As can be seen, public data 204 comprises an omitted textual data 204a portion and an omitted facial data 204b portion. The modified stream may thus have those areas blacked out or blurred. Private data 206 comprises the extracted textual data 206a and the extracted facial data 206b. Private data 208 comprises metadata 208a pertaining to textual data 206a and metadata 208b pertaining to facial data 206b.

Classifier 108 receives public data 204, private data 206, and metadata 208. Suppose that multiple storage devices are accessible for classifier 108. In some aspects, to provide an added layer of protection, classifier 108 may store public data 204 in data storage 114 (e.g., a first device), private data 206 in data storage 210 (e.g., a second device), and private metadata 208 in data storage 212 (e.g., third device). By storing all data in separate locations, if data storage 114 is compromised by an unauthorized entity, the entity will not have access to the private information. Even if the entity accesses private data 206, the entity will need to also access private metadata 208 to know where each extracted piece of private information should be merged in public data 204.

In some aspects, to add an additional layer of protection, each different type of private information is stored in a separate location. For example, facial private data may be stored in a different server than license plate private data. Likewise, the metadata associated with the respective private data may be stored in separate locations. This makes it harder for an unauthorized entity to reconstruct the original stream because the entity will have to first determine and then access all of the locations where portions of stream 202 are distributed.

Referring back to ML module 112, in some aspects, ML module 112 may be trained to sort private data and public data automatically. For example, the dataset used to train ML module 112 may include tagged streams and output streams. Consider stream 202 as an input training stream. The training data may include a plurality of frames in stream 202, each tagged with one of the plurality of tags (e.g., "surveillance"). The training data may also include frames from other streams and their respective tags. For each input frame in an input stream, there are at least two output frames (one public frame and at least one private frame). The output public frame may look like public data 204, where the private data (e.g., textual data 206a and facial data 206b) portion(s) are omitted/redacted. For example, an output vector representation of the output public frame may comprise pixel values. In the redacted portions, the pixel values may be set to "0." The second set of frames are part of private data 206. For example, a first private frame may depict textual data 206a. In this frame, the pixel values associated with the portion depicting textual data 206a may retain their original values, whereas all other portions of the frame may be set to "0." Likewise, a second private frame in the second set of frames may depict facial data 206b. Here, the pixels associated with facial data 206b will retain their values in the frame, while all other pixels will be set to "0." It should be noted that the frame sizes of each output frame are kept equal and all omitted/redacted parts are set to "0." Thus, the input frame can easily be recreated by overlaying each output frame (e.g., the "0" values will add to the original value). For example, if the original pixel value is 255, adding a 0 redacted value will still equal a sum of 255. Combining the three output frames in the given example would generate a frame that looks like stream 202's frame.

Given the input frame pixel values, the output frame(s) pixel values and the tag, ML module 112 learns how to generate any set of output private frame(s) and public frame when provided an arbitrary input frame and a known tag. In some aspects, ML module 112 may be trained using a classifier that detects features to redact and/or extract into a separate frame. In some aspects, ML module 112 may be a neural network that automatically detects features to redact/omit and/or extract.

In some aspects, ML module 112 may be split into multiple classifiers. For example, one classifier may extract an output private data frame for facial images only and another classifier may extract an output private data frame for textual data only. This approach may make feature detection more robust, but will take longer to process.

Figure 3:
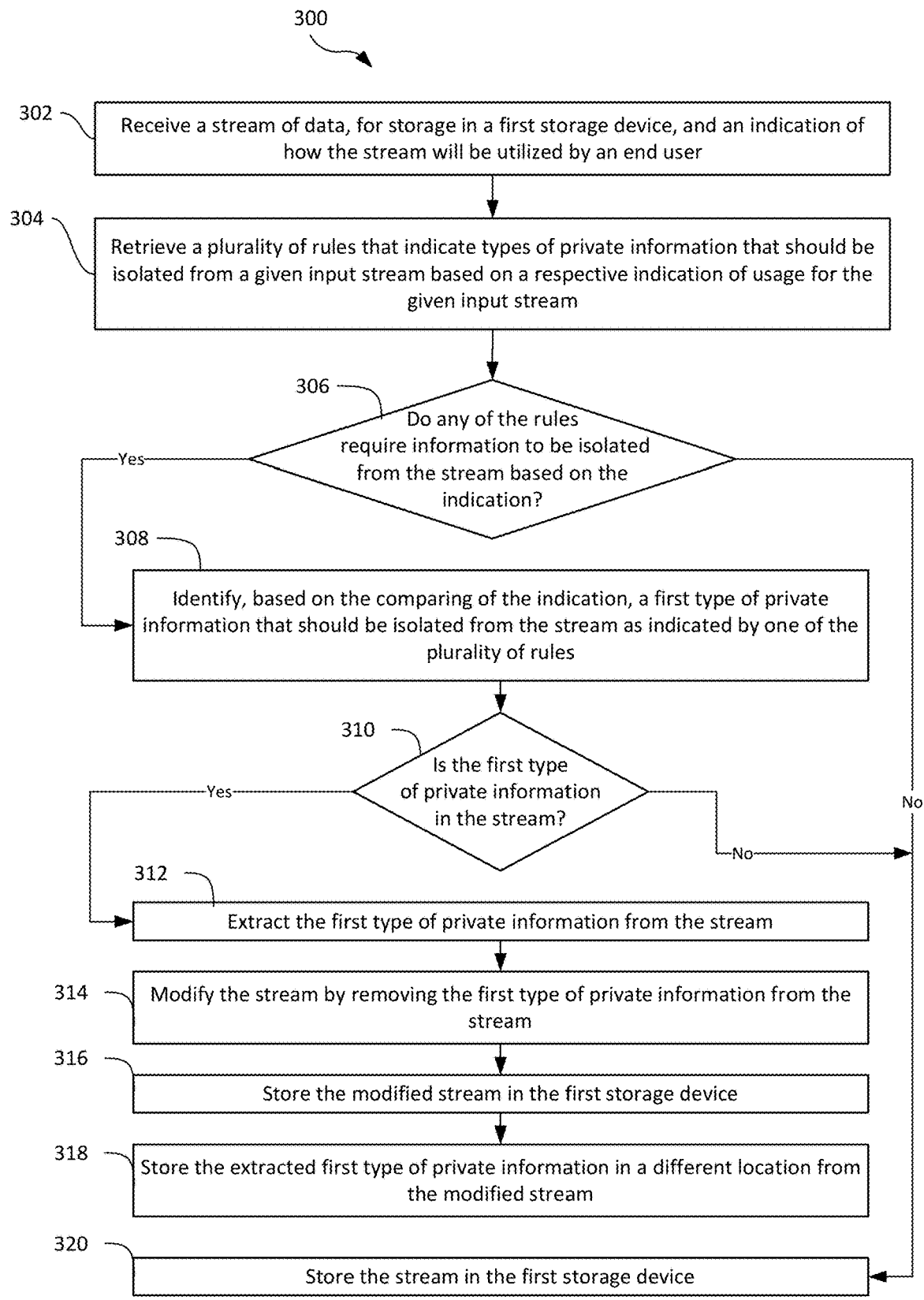
FIG. 3 illustrates a flow diagram of a method for isolating private information in streamed data.

FIG. 3 illustrates a flow diagram of method 300 for isolating private information in streamed data, in accordance with aspects of the present disclosure. At 302, system 100 receives a stream of data, for storage in a first storage device, and an indication of how the stream will be utilized by an end user. At 304, system 100 retrieves a plurality of rules that indicate types of private information that should be isolated from a given input stream based on a respective indication of usage for the given input stream. At 306, system 100 determines whether any of the rules require information to be isolated from the stream based on the indication.

In response to determining that at least of the rules requires isolating information for the indication provided, method 300 proceeds to 308. At 308, system 100 identifies, based on the comparing of the indication, a first type of private information that should be isolated from the stream as indicated by one of the plurality of rules. At 310, system 100 determines whether the first type of private information is in the stream. If the first type of private information is in the stream, method 300 advances to 312. At 312, system 100 extracts the first type of private information from the stream. At 314, system 100 modifies the stream by removing the first type of private information from the stream. At 316, system 100 stores the modified stream in the first storage device. At 318, system 100 stores the extracted first type of private information in a different location from the modified stream.

If at 306, system 100 determines that none of the rules apply to the stream based on the indication, or if at 310, system 100 determines that the first type of private information (or any private information associated with the rule) is not in the stream, method 300 advances to 320. At 320, system 100 stores the original stream in the first storage device as is.

Figure 4:
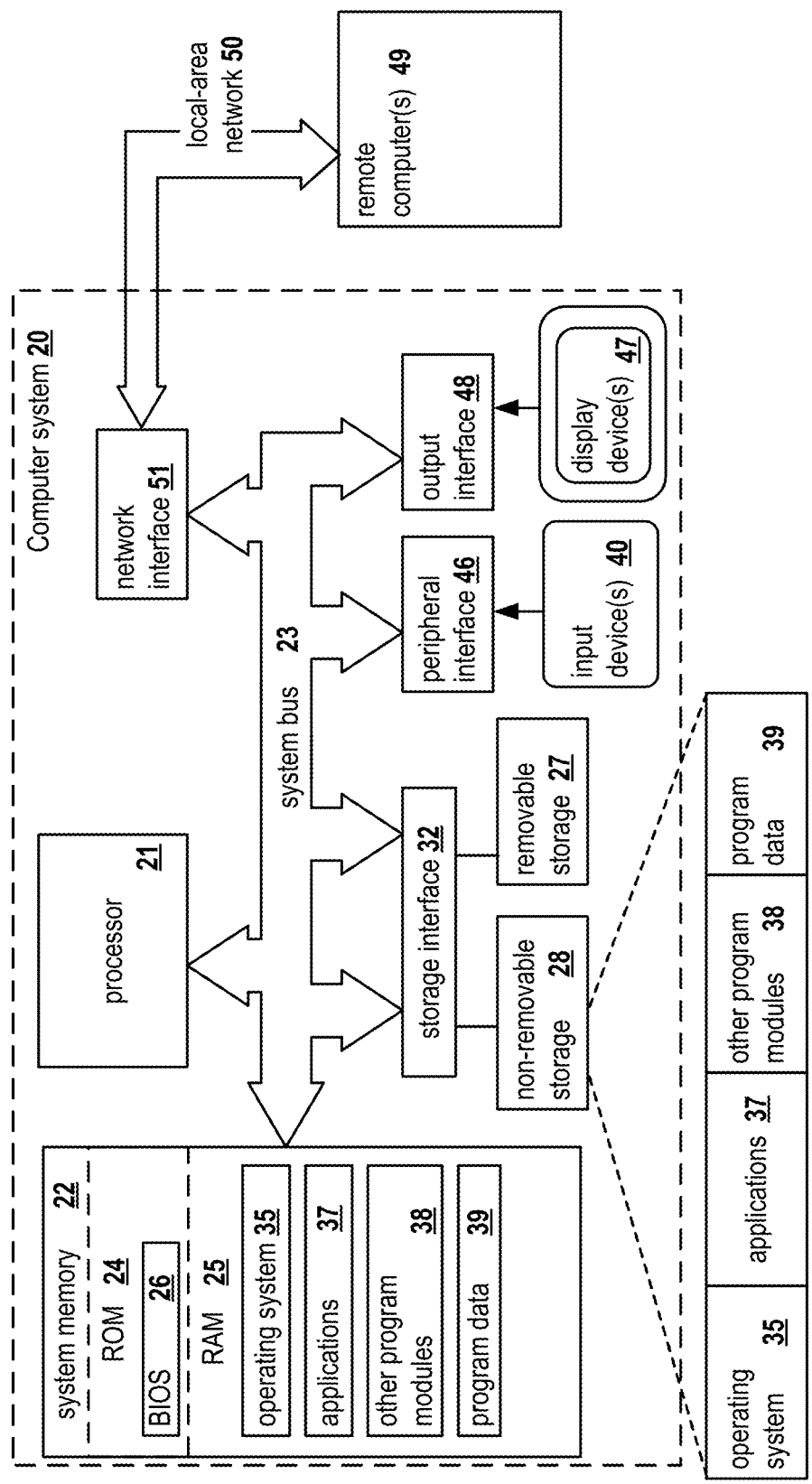
FIG. 4 presents an example of a general-purpose computer system on which aspects of the present disclosure can be implemented.

FIG. 4 is a block diagram illustrating a computer system 20 on which aspects of systems and methods for isolating private information in streamed data may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-3 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for isolating private information in streamed data, the method comprising:
   receiving a stream of data, wherein the stream comprises a first image, for storage in a first storage device, and an indication of how the stream will be utilized by an end user;
   comparing the indication against a plurality of rules, wherein each rule indicates a type of private information that should be isolated from a given input stream based on a respective indication of usage for the given input stream;
   identifying, based on the comparing of the indication, a first type of private information that should be isolated from the stream;
   in response to determining that the first type of private information is present in the stream, wherein the first type of private information is in a portion of the first image, extracting the first type of private information from the stream by:
      generating a second image of a same size as the first image;
      including the portion of the first image in the second image; and
      setting pixel values in remaining portions of the second image to zero;
   modifying the stream by removing the first type of private information from the stream by:
      setting pixel values in the portion of the first image to zero;
   storing the modified stream in the first storage device; and
   storing the extracted first type of private information in a different location from the modified stream, wherein an original version of the first image is recreated by concatenating the first image in the modified stream and the second image.

2. The method of claim 1, wherein the different location is one of: a second storage device or a different portion of the first storage device.

3. The method of claim 1, wherein the extracted first type of private information is, based on a rule of the plurality of rules, one of:
   (1) facial images;
   (2) names;
   (3) addresses;
   (4) license plate numbers;
   (5) financial information;
   (6) medical information; and
   (7) government records.

4. The method of claim 1, wherein extracting the first type of private information from the stream further comprises generating metadata that comprises information for merging the extracted first type of private information and the modified stream to reproduce the stream originally received.

5. The method of claim 4, further comprising storing the metadata in the different location with the extracted first type of private information.

6. The method of claim 4, further comprising storing the metadata in another location that is different from both the first storage device and the different location where the extracted first type of private information is stored.

7. The method of claim 1, further comprising:
   identifying, based on the comparing of the indication, a second type of private information that should be isolated from the stream;
   in response to determining that the second type of private information is present in the stream, extracting the second type of private information from the stream; and
   modifying the stream by removing the second type of private information from the stream.

8. The method of claim 7, further comprising storing the extracted second type of private information in the different location with the extracted first type of private information.

9. The method of claim 7, further comprising storing the extracted second type of private information in another location that is different from both the first storage device and the different location where the extracted first type of private information is stored.

10. A system for isolating private information in streamed data, the system comprising:
   a hardware processor configured to:
      receive a stream of data, wherein the stream comprises a first image, for storage in a first storage device, and an indication of how the stream will be utilized by an end user;
      compare the indication against a plurality of rules, wherein each rule indicates a type of private information that should be isolated from a given input stream based on a respective indication of usage for the given input stream;
      identify, based on the comparing of the indication, a first type of private information that should be isolated from the stream;
      in response to determining that the first type of private information is present in the stream, wherein the first type of private information is in a portion of the first image, extract the first type of private information from the stream by:

generating a second image of a same size as the first image;

including the portion of the first image in the second image; and setting pixel values in remaining portions of the second image to zero;

modify the stream by removing the first type of private information from the stream by:

setting pixel values in the portion of the first image to zero;

store the modified stream in the first storage device; and store the extracted first type of private information in a different location from the modified stream, wherein an original version of the first image is recreated by concatenating the first image in the modified stream and the second image.

11. The system of claim 10, wherein the different location is one of: a second storage device or a different portion of the first storage device.

12. The system of claim 10, wherein the extracted first type of private information is, based on a rule of the plurality of rules, one of:
(1) facial images;
(2) names;
(3) addresses;
(4) license plate numbers;
(5) financial information;
(6) medical information; and
(7) government records.

13. The system of claim 10, wherein the hardware processor is further configured to extract the first type of private information from the stream by generating metadata that comprises information for merging the extracted first type of private information and the modified stream to reproduce the stream originally received.

14. The system of claim 13, wherein the hardware processor is further configured to store the metadata in the different location with the extracted first type of private information.

15. The system of claim 13, wherein the hardware processor is further configured to store the metadata in another location that is different from both the first storage device and the different location where the extracted first type of private information is stored.

16. The system of claim 10, wherein the hardware processor is further configured to:

identify, based on the comparing of the indication, a second type of private information that should be isolated from the stream;

in response to determining that the second type of private information is present in the stream, extract the second type of private information from the stream; and modify the stream by removing the second type of private information from the stream.

17. The system of claim 16, wherein the hardware processor is further configured to store the extracted second type of private information in the different location with the extracted first type of private information.

18. The system of claim 16, wherein the hardware processor is further configured to store the extracted second type of private information in another location that is different from both the first storage device and the different location where the extracted first type of private information is stored.

19. A non-transitory computer readable medium storing thereon computer executable instructions for isolating private information in streamed data, including instructions for:

receiving a stream of data, wherein the stream comprises a first image, for storage in a first storage device, and an indication of how the stream will be utilized by an end user;

comparing the indication against a plurality of rules, wherein each rule indicates a type of private information that should be isolated from a given input stream based on a respective indication of usage for the given input stream;

identifying, based on the comparing of the indication, a first type of private information that should be isolated from the stream;

in response to determining that the first type of private information is present in the stream, wherein the first type of private information is in a portion of the first image, extracting the first type of private information from the stream by:

generating a second image of a same size as the first image;

including the portion of the first image in the second image; and setting pixel values in remaining portions of the second image to zero;

modifying the stream by removing the first type of private information from the stream by:

setting pixel values in the portion of the first image to zero;

storing the modified stream in the first storage device; and storing the extracted first type of private information in a different location from the modified stream, wherein an original version of the first image is recreated by concatenating the first image in the modified stream and the second image.

20. The non-transitory computer readable medium of claim 19, wherein the different location is one of: a second storage device or a different portion of the first storage device.

* * * * *